Figure 1:
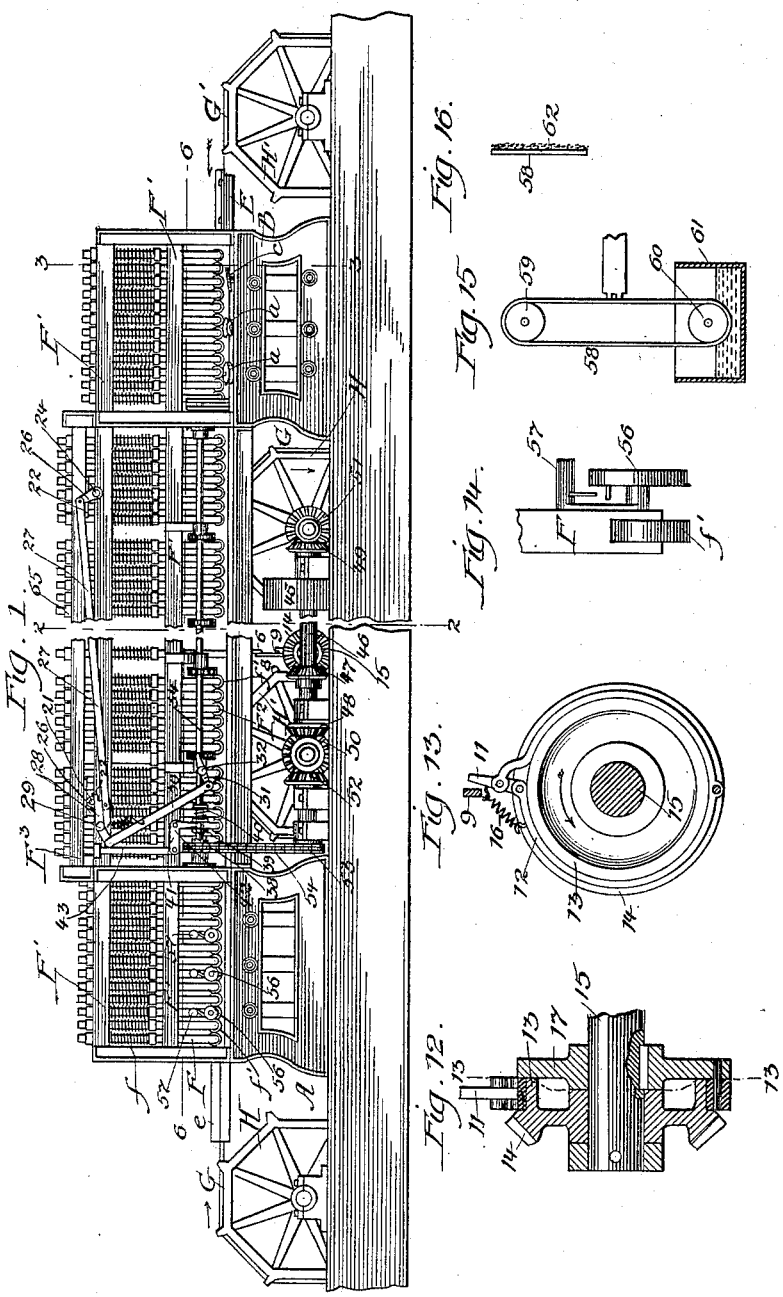

No. 661,542. Patented Nov. 13, 1900.
A. T. LINDERMAN.
LUMBER JOINING MACHINE.
(Application filed May 26, 1900.)
(No Model.) 6 Sheets—Sheet 1.

Witnesses
Frank L Blanchard
H. M. Munday

Inventor:
ALBERT T. LINDERMAN
By Munday, Evarts & Adcock.
HIS Attorneys

No. 661,542. Patented Nov. 13, 1900.
A. T. LINDERMAN.
LUMBER JOINING MACHINE.
(Application filed May 26, 1900.)

(No Model.) 6 Sheets—Sheet 2.

FIG. 2.

WITNESSES:
Lew. C. Curtis
H. W. Munday

INVENTOR:
ALBERT T. LINDERMAN
BY Munday, Evarts & Adcock.
HIS ATTORNEYS.

No. 661,542. Patented Nov. 13, 1900.
A. T. LINDERMAN.
LUMBER JOINING MACHINE.
(Application filed May 26, 1900.)
(No Model.) 6 Sheets—Sheet 3.
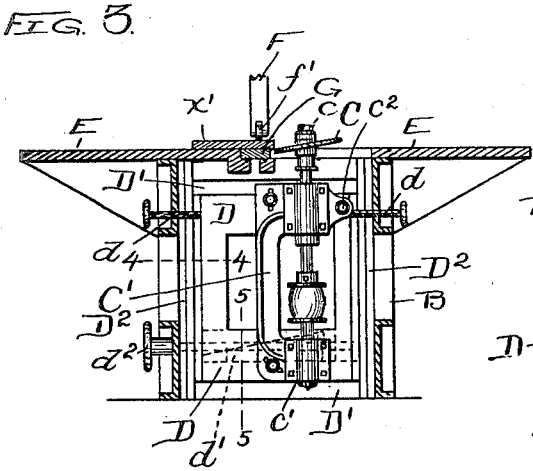
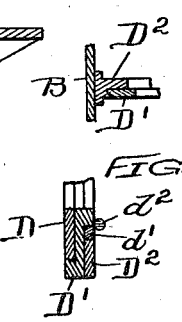
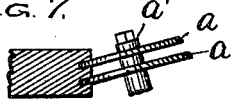
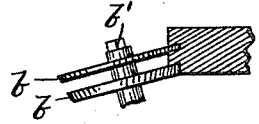
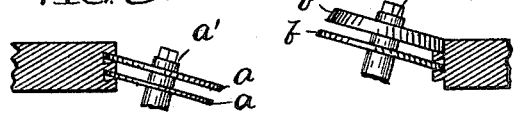
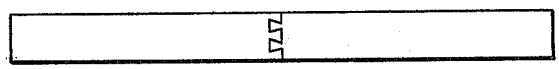
WITNESSES: INVENTOR:
ALBERT T. LINDERMAN
BY Munday, Evarts & Adcock.
HIS ATTORNEYS.
THE NORRIS PETERS CO., PHOTO-LITHO., WASHINGTON, D. C.

No. 661,542. Patented Nov. 13, 1900.
A. T. LINDERMAN.
LUMBER JOINING MACHINE.
(Application filed May 26, 1900.)
(No Model.) 6 Sheets—Sheet 4.
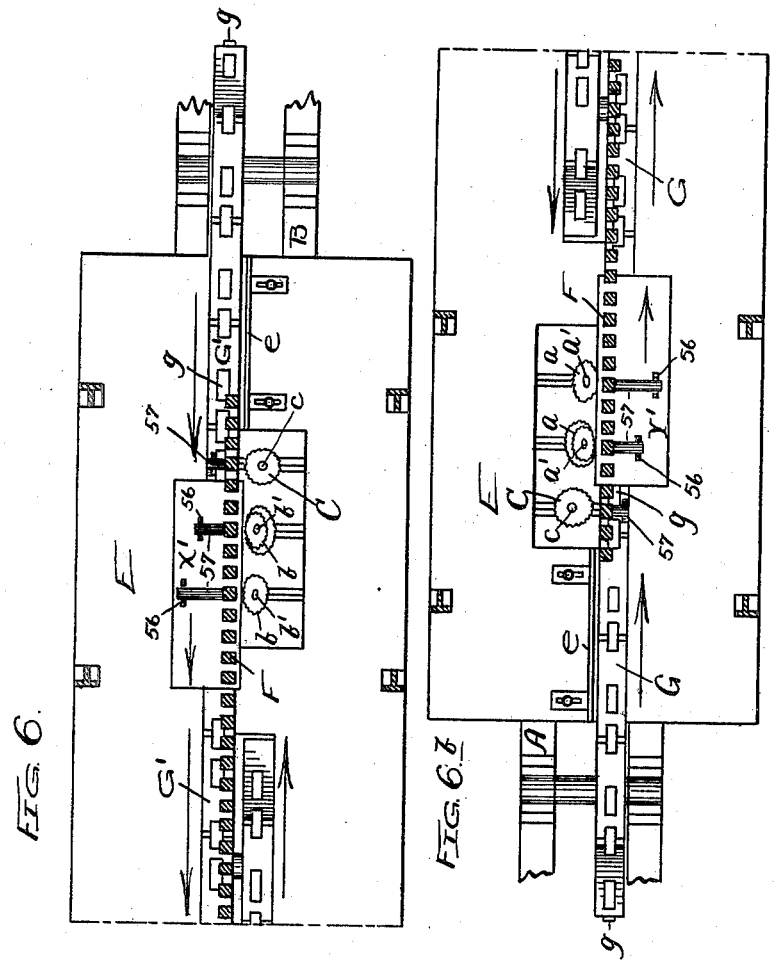
WITNESSES:
Lew. C. Curtis
INVENTOR:
ALBERT T. LINDERMAN
BY Munday, Evarts & Adcock
HIS ATTORNEYS.

No. 661,542. Patented Nov. 13, 1900.
A. T. LINDERMAN.
LUMBER JOINING MACHINE.
(Application filed May 26, 1900.)
(No Model.) 6 Sheets—Sheet 5.
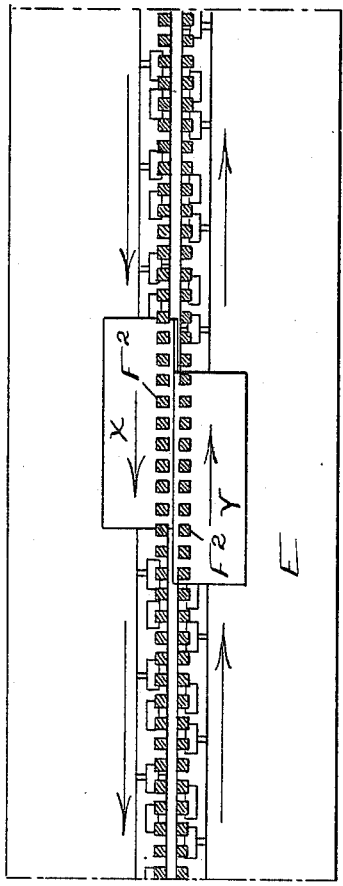
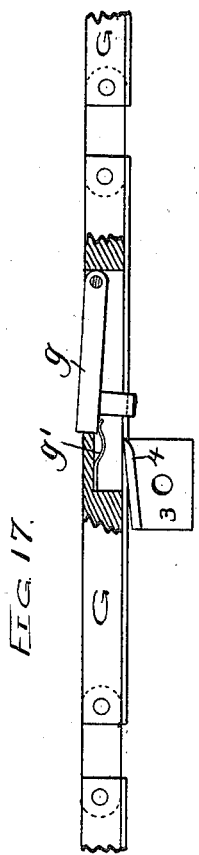
WITNESSES:
Lew. C. Curtis
H. W. Munday
INVENTOR:
ALBERT T. LINDERMAN
BY Munday, Evarts & Adcock.
HIS ATTORNEYS.

No. 661,542. Patented Nov. 13, 1900.
A. T. LINDERMAN.
LUMBER JOINING MACHINE.
(Application filed May 26, 1900.)

(No Model.) 6 Sheets—Sheet 6.

WITNESSES:
Lew. C. Curtis
H. W. Munday

INVENTOR:
ALBERT T. LINDERMAN
BY Munday, Evarts & Adcock
HIS ATTORNEYS.

UNITED STATES PATENT OFFICE.

ALBERT T. LINDERMAN, OF WHITEHALL, MICHIGAN.

LUMBER-JOINING MACHINE.

SPECIFICATION forming part of Letters Patent No. 661,542, dated November 13, 1900.

Application filed May 26, 1900. Serial No. 18,052. (No model.)

*To all whom it may concern:*

Be it known that I, ALBERT T. LINDERMAN, a citizen of the United States, residing in Whitehall, in the county of Muskegon and State of Michigan, have invented a new and useful Improvement in Lumber-Joining Machines, of which the following is a specification.

I have heretofore practiced the uniting of small lumber by cutting dovetail tongues and grooves along the longitudinal edges of the lumber and then weaving or joining the pieces by sliding the tongues upon the edges of some of the pieces into the grooves formed in the edges of the other pieces. The forming of the dovetail tongues and grooves were, however, separate operations from the weaving or joining of the lumber and performed in separate and distinct machines.

In my present invention I aim to unite two dovetailing-machines together and also to render them capable of joining lumber, so that the three operations of tonguing, grooving, and weaving may all be performed by a single machine, thereby saving all necessity for handling the stuff after the tonguing and grooving and also saving largely in the number of attendants required.

My improved machine embodies two sets of cutters for forming interfitting dovetails on the surfaces of two pieces of lumber and means for bringing said pieces together endwise, with the dovetails in alinement, so that they may then be forced together to carry the dovetails into engagement.

The machine also embraces means for withdrawing the pushing-dogs by which the stock is fed from action at the completion of the weaving or uniting operation, so that the work may not be undone by any continued movement of the feeding devices.

The machine further embraces means for moving the united lumber transversely of the machine at the completion of the weaving operation.

These and further features of the invention are fully explained in the subjoined description and illustrated in the accompanying drawings, in which—

Figure 18:
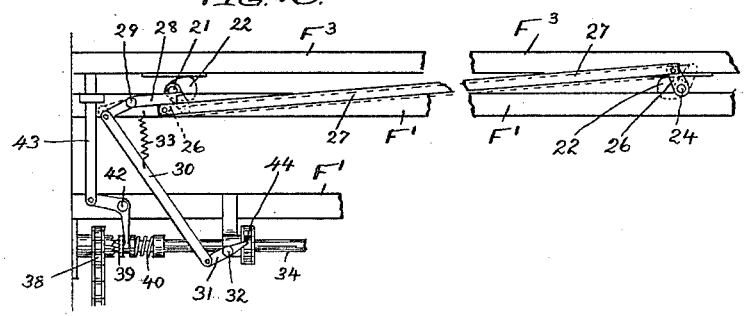
Figure 19:
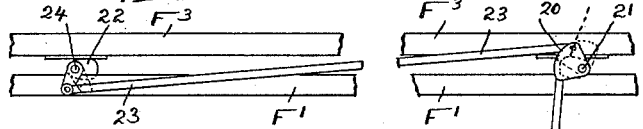
Figure 20:
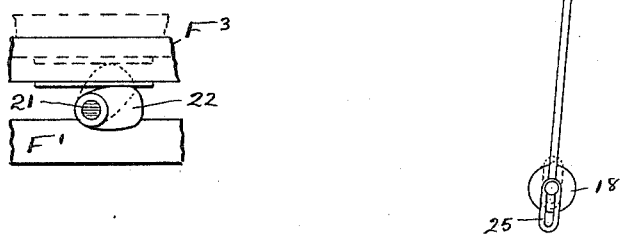

Figure 1 is a side elevation of the machine. Fig. 2 is a transverse vertical section on the line 2 2 of Fig. 1, enlarged. Fig. 3 is a section on the line 3 3 of Fig. 1. Figs. 4 and 5 are detail sections on the lines 4 4 and 5 5, respectively, of Fig. 3. Figs. 6, $6^a$, and $6^b$ are each partial horizontal sections upon the line 6 6 of Fig. 1. Figs. 7 and 8 show the dovetailing-saws employed for cutting the grooves of the dovetail joint. Figs. 9 and 10 are like views showing the saws employed in cutting the tongues. Fig. 11 is an edge view of two pieces of lumber dovetailed together by my machine. Fig. 12 is a section of the clutch employed to raise the pressure-bars. Fig. 13 is another section of the same upon the line 13 13 of Fig. 12. Fig. 14 is a detail view showing the manner of registering the number of lineal feet of lumber united by the machine. Fig. 15 is an elevation of the gluing-belt. Fig. 16 is an enlarged section of said belt. Fig. 17 is a detail section showing the means employed for withdrawing the pushing-dogs of the carrier from operation. Figs. 18, 19, and 20 are details illustrating the operation of the tripping mechanism.

As already stated, I employ in this machine two sets of dovetail or other tongue and groove cutting devices. One of these sets is supported in the frame A, the other in the frame B. Each set consists of such number of cutters as the nature of the joint to be formed requires. I have used generally a double dovetail joint—that is to say, one consisting of two tongues upon the edge of one piece and two corresponding grooves upon the edge of the other piece—and for the formation of such tongues and grooves four saws $a$ $a$ and $b$ $b$ may be used, the same being mounted in pairs upon inclined spindles $a'$ $a'$ and $b'$ $b'$. These spindles are arranged in line with each other, but inclined in opposite directions, so that the saws of one spindle will cut one side of the dovetail tongue or groove and the saws of the companion spindle will cut the other side thereof and complete the cutting operation. Accompanying each pair of spindles, or each spindle in case the joint used only requires the use of one spindle, I employ a wabble-saw C, for the purpose of truing or finishing the edge of the lumber. This saw C is supported upon the arbor $c$, and the latter is held in bearings $c'$ upon the frame C'. This frame is pivoted at $c^2$ and secured by set-screws to a horizontallyadjustable frame D, the adjustment whereof is obtained by the adjusting-screws $d$, bearing upon the edge of the frame. The frame C' can be varied as to its inclination upon the frame D by the mode of attachment shown, and frame D is supported in another frame D', and the latter is vertically adjustable in the frame $D^2$ by moving the wedge $d'$ in or out, as the case requires, by means of the screw $d^2$. The dovetailing-spindles are supported in a similar manner to that illustrated in the case of the wabble-saw. Each of the dovetailing-machines is provided with a table E, on which the stuff to be joined is placed, and a gage $e$, against which it is positioned preparatory to the operation.

Above the tables E are arranged suitable pressure-exerting devices, adapted to bear upon the stuff and hold it in a true path while it is operated upon. The pressure devices which I prefer to employ consist of the series of spring-depressed bars F, supported in suitable framework F', each provided with its own pressure-creating spring $f$ and also with an antifriction-roller $f'$. These bars are employed in such number as may be requisite for the work in hand; but I prefer to employ a large number and to place them close together, so that the short lumber will be securely held and pressure be maintained upon all the lumber until it has been cut and joined together. This pressure keeps the pieces in line and prevents any movement by them upon the carrier until after the completion of the weaving operation. Each dovetailing-machine is also provided with appropriate carrier mechanism whereby the lumber is forced to and past the tongue and groove cutters. The form of carrier which I deem best consists of links G in the case of one of the dovetail-machines and G' in the case of the other, each united to form an endless band or series and passing over sprocket-wheels H H and H' H', respectively. These carriers are precisely alike; but they move in opposite directions, as indicated by the arrows. They also move in harmony and at a uniform speed, their driving-wheels receiving power from the same shaft by means of like gearing, as hereinafter stated. They travel in parallel lines and are located close together, so they may be utilized to unite the dovetailed lumber. Each link G and G' may be provided with a dog $g$, kept normally in position by a spring $g'$ and adapted to push the stuff by engaging with its end and to carry it so long as the dog remains in operating position. Each dog, however, is adapted to be depressed, so as to withdraw it from engagement with the lumber at the conclusion of the weaving operation, as hereinafter more fully set forth.

No extended description of the tongue and groove cutting mechanism is here given, as they are in the main of a well-known construction, and it will be understood that my invention is not limited to the illustrated construction of those parts except in so far as such construction is specifically set forth in the claims. The essential feature in connection with them is that they be relatively so arranged as to bring the tongue or tongues formed by one cutting mechanism in register with the groove or grooves formed by the other cutting mechanism, so that when the pieces of lumber operated upon meet, as they will in the further movement of the carriers, the tongues and grooves just cut upon their adjoining edges will be forced into engagement and the pieces be thereby united. This necessitates the placing of one set of cutters upon one side of the plane wherein the pieces of lumber meet and the other set upon the opposite side of such plane, and is illustrated at Figs. 6 and $6^b$, which show in plan the two sets of cutters.

The carriers of the two cutting mechanisms are extended so that their paths lap by each other sufficiently to enable the tongue-and-grooved stuff to be united after being cut and before it is discharged. The extended or lapping portions of the carriers (shown at Fig. $6^a$) located between the cutting mechanisms (shown at Figs. 6 and $6^b$) and their pressure devices form the weaving portion of my combined machine. They carry the pieces of stuff forward and toward each other and in such accurate register as to insure the entry of the tongue of the one within the groove of the other. The drawings show at Fig. $6^a$ two boards X Y partially joined by my machine, the same having been previously tongued and grooved by the cutting mechanisms already described. Other boards X' Y' are shown undergoing the cutting operations in Figs. 6 and $6^b$.

To stop the feeding action of the carriers at the proper time, and thus avoid any undoing of the united lumber by pushing the pieces too far, I withdraw the pushing-dogs $g$ of the carrier from action at the completion of the joining operation. This may be done as follows: Each of said dogs carries a depending hook 2, which in the travel of the carrier encounters a cam 3, having a lateral flange 4, adapted to engage the hook and draw it down, and thereby depress the dog below the surface of the carrier.

Any suitable pressure devices may be used with the weaving portion of the machine; but I prefer to employ spring-depressed bars $F^2$, similar to the bars F and having the same springs $f$ and rollers $f'$. To render them capable of being lifted, so as to free the board at the completion of the weaving operation and permit its discharge, I support the bars $F^2$ or so many of them as it is necessary to lift for this purpose in a movable frame $F^3$ and operate said frame at the proper time by appropriate mechanism, which may consist of the following: When the dog $g$ is depressed, it strikes a plate 5, mounted upon one end of a lever 6, pivoted centrally at 7, and depresses the end of said lever. From the opposite end of the lever extends a link 8, connecting the lever with a stop 9, pivoted stationarily at 10. The movement just ascribed to lever 6 results in a lifting of the stop 9 and a subsequent release from engagement with said stop of the dog 11, pivoted upon one end of the friction-band 12, encircling the hub 13 of the gear 14 upon the cross-shaft 15. The release of the dog from the stop allows the spring 16 to tighten the friction-band upon the hub, and as the band is keyed to the disk 17, which is fast upon said shaft, motion is thereby communicated to the shaft from the gear, said gear being continuously rotated, as hereinafter stated. The movement now communicated to the shaft 15 actuates the crank-wheel 18 and lifts the pitman 19. This pitman is connected at its upper end to a triangular piece 20, mounted upon a cross-shaft 21. This cross-shaft carries lifting-cams 22, which are located upon the movable frame F³. From the triangular rocking piece 20 a pitman 23 extends to a second cam-shaft 24, provided with like lifting-cams 22. By this same mechanism it will be seen that both ends of the movable frame F³ will be simultaneously raised through the actuation of shaft 15, thereby freeing the board from the pressure of the pressure devices. The shaft 15 makes one continuous revolution only at each operation, being stopped by the encountering of the stop 9 by the dog 11 and the consequent loosening of the friction-band. The further movement of the shaft is without effect upon the pitman 19 by reason of the long slot 25, formed in the lower end of said pitman. To further insure uniformity of action between the cam-shafts which raise the frame F³, I also connect them at the other side by cranks 26 and a pitman 27. When the frame F³ is raised, the cams being then in the lifting position, a pawl 28 falls behind one of the cranks 26 and operates to hold the crank-shaft stationary for a time with the frame in a raised position. During this interval the board is discharged from the machine either by an attendant or by automatic mechanism, one form of such mechanism being hereinafter set forth. The pawl 28 is pivoted stationary at 29, and its farther end is joined to a connecting-rod 30, which is pivoted to a rocking lever 31, pivoted at 32. A spring 33 exerts an upward tension upon the connecting-rod 30, so that as soon as the pitman 26 has been moved to bring the cams to their lifting position said pawl will be at liberty to fall in obedience to said spring 33. When the requisite time has elapsed for the discharge of the united board, the pawl 28 is thrown out of engagement with the crank 26, as hereinafter set forth.

Longitudinally of the weaving portion of the machine are two shafts 34 and 35, carrying pulleys 36, which are arranged opposite each other and actuate the discharge-belts 37. Any suitable number of these pulleys and belts can be employed. I show in the drawings four of the belts. The shaft 34 carries a continuously-operated sprocket-wheel 38, loosely mounted upon the shaft, but clutched thereto at intervals by the clutch 39. A spring 40 is employed to close this clutch, but is normally prevented from doing so by the bell-crank lever 41, pivoted at 42 and having one end inserted in an annular groove in the sliding part of the clutch. The bell-crank lever is controlled by a bar 43, which extends up to the frame F³ and is depressed and retained in its normal position by said frame with the clutch open. When, however, the frame is raised, as already described, the pressure upon bar 43 is released, so that the clutch can be closed by the spring 40. This results in the imparting of motion to shafts 34 and 35, and such motion continues until one of the pins or discharging projections 44 upon one of the bands 37 strikes the pivoted lever 31 and causes said lever to throw the pawl 28 out of engagement with the crank 26. The weight of the frame F³ will now cause it to return to its normal position, and in so doing it depresses bar 43 and releases clutch 39, so that the shafts 34 and 35 must stop.

The discharge-bands are each provided with two projections 44, and the motion communicated to them should be sufficient to carry the bands through one-half their travel, so that when next actuated one of the discharging-points will be in position for quick operation. The stopping of the discharging devices and the lowering of the frame leaves all the parts in proper position for the next weaving operation.

Power is given to the machine for the actuation of the carriers and the discharge mechanism by means of the pulley 45 upon the shaft 46. The shaft 46 carries a bevel-gear 47, meshing with the gear 14. It also carries bevel-gears 48 and 49, meshing with like gears 50 and 51, respectively, for driving the wheels H and H' of the carriers at a uniform speed. A gear 52 engages with gear 50, and being mounted on the same shaft with the sprocket-wheel 53 serves to actuate the sprocket-wheel 38, already mentioned, by means of the sprocket-chain 54.

It is desirable to know the amount of work done in the machine, and for this purpose I apply one or more automatic registers, each consisting of a roller 56, adapted to bear upon the stuff united by the machines and give the lineal measurements thereof, a register 57 being attached to note the rotations of the roller. These devices are applied to the machine opposite the cutters, as shown. There may be one such register for each of the different widths of stuff operated upon by the machine, and I have shown three located at different distances from the cutters. Of course those farthest away will only note the amount of the wider stuffs, while those nearest will measure both narrow and wide stuff.

For the purpose of applying glue to the joints previous to the weaving of the boards a gluing-band 53 may be employed. It passes around pulleys 59 and 60, and the latter should be located in a receptacle 61 for liquid glue. The belt passes upward vertically in contact with the edge of one of the pieces of lumber, as shown at Fig. 15. I prefer to form the outer surface of the belt of some soft fibrous material, like felt, as shown at 62. The shaft of pulley 59 may be driven by belt 70 from the shaft of carrier-wheel H.

Of course only such of the carrier-links as it is desired to push the stuff are provided with dogs $g$, and as the number of dogs employed will vary with the different lengths of stuff operated upon I make such dogs removable. The position of the cam 3 may also require change, and hence I support it in a longitudinal groove 63 in a stationary part of the machine by means of the bolt 64, there being a number of bolt-holes (not shown) or a slot in the grooved stationary part of the machine to permit the necessary adjustment of the cam.

Of the pressure-bars which pass through the frame $F^3$, I provide such as are to be lifted with said frame with collars 65. These collars may be removable, so that in case of the short stuff the number which will be required to be lifted by the frame $F^3$ may be reduced to suit the length of the stuff.

My machine enables me to position the stuff when it is first placed in the machine so that it requires no further attention from the operator until after it is woven together and discharged. The pieces supplied to each of the cutting mechanisms move in a straight line past their respective cutters and into engagement with each other. They do not change their relative positions, except that they are caused to approach each other, and hence if accurately placed at the start their tongues and grooves will register and enter one within the other when they meet.

The operation of the machine is already fully set forth and need not be repeated.

Of course I do not wish to be limited in all my claims either to the presence of two oppositely-moving feeders, or to the kind or construction shown of such feeders, or to dovetail cutters of the kind, number, or construction shown, or to the construction shown of the transversely-moving device for forcing the united lumber off the carrier, or to the retractable pushing devices.

I claim—

1. The combination of cutters for forming the tongue upon the edge of one piece of lumber, carrier mechanism for carrying said piece past said cutters, cutters for forming the groove upon the edge of the other piece of stuff, and carrier mechanism for carrying said grooved piece, said cutters being relatively arranged and said carrier mechanisms moving in opposite directions and being extended so as to carry the pieces of stuff toward each other and cause them to unite, substantially as set forth.

2. The combined tonguing, grooving and weaving machine, consisting of cutters for forming the tongues, other cutters for forming the grooves, and carriers for each set of said cutters, said carriers moving in opposite directions and carrying the pieces of stuff toward and into engagement with each other, substantially as specified.

3. The combined tonguing, grooving and weaving machine, consisting of cutters for forming the tongues and grooves upon the edges of the lumber, and two oppositely-moving carriers relatively arranged and adapted to carry the pieces of lumber past the cutters and into engagement with each other, substantially as specified.

4. The combined tonguing, grooving and weaving machine, consisting of cutters for forming the tongues and grooves upon the adjoining edges of the lumber, two oppositely-moving carriers relatively arranged and adapted to carry the pieces of lumber past the cutters and into engagement with each other, and pressure devices for holding the lumber down upon the carriers, substantially as specified.

5. The machine for dovetailing and uniting lumber, consisting of cutters for forming the tongues, other cutters for forming the grooves, two oppositely-moving carriers for moving the lumber past the cutters and into engagement, pressure devices holding the lumber down upon the carriers while it is being cut, releasable pressure devices holding the lumber while it is being united, and means for releasing said last-mentioned pressure devices, substantially as specified.

6. The combined tonguing, grooving and weaving machine, consisting of cutters for forming the tongues and grooves, and means for feeding and uniting the lumber, said means being provided with pushing devices which are withdrawn from their acting positions at the conclusion of the uniting operation, substantially as specified.

7. The combination with oppositely-moving carriers arranged and adapted to unite dovetailed lumber, of mechanism moving transversely of the carrier and acting to eject the united lumber from the machine, substantially as specified.

8. The combination with oppositely-moving carriers arranged and adapted to unite dovetailed lumber, of releasable pressure devices for each of said carriers acting to hold the lumber down thereon, means for releasing said pressure devices, and means for discharging the united lumber, substantially as specified.

9. The combination with oppositely-moving carriers arranged and adapted to unite dovetailed lumber, and each provided with retractable pushing devices, of means for simultaneously retracting the pushing devices of both carriers, substantially as specified.

10. The combination of the oppositely-moving carriers adapted to unite dovetailed lumber, the retractable pushing devices mounted upon said carriers and means such as cam 3, for retracting said pushing devices, with pressure devices for holding the lumber down while it is being joined, and means for raising said pressure devices at the completion of the joining, substantially as set forth.

11. The combination with the oppositely-moving carriers adapted to unite dovetailed lumber, and each provided with retractable pushing devices, of means for simultaneously retracting the pushing devices of both carriers, and means for ejecting the united lumber, substantially as specified.

12. In a lumber-joining machine, mechanism for uniting the lumber together, consisting of two oppositely-moving carriers, pressure devices for holding the lumber down upon said carriers while it is being united, and means for lifting said pressure devices, and automatic mechanism for discharging the united lumber, substantially as set forth.

13. The combination with the tongue and groove cutters, of feeding devices moving in opposite directions and relatively arranged and adapted to carry the lumber into engagement, substantially as set forth.

14. The combination with the endless and oppositely-moving carriers and their retractable pushing devices, of cams 3 for withdrawing said pushing devices, substantially as specified.

15. The combination with the endless and oppositely-moving carriers and their retractable pushing devices, of adjustable cam 3, for withdrawing said pushing devices from the lumber, substantially as set forth.

16. The combination with the oppositely-moving carriers of pressure devices, a movable frame $F^3$ supporting said pressure devices, mechanism for lifting said frame and cams for locking the frame momentarily in the raised position, substantially as specified.

17. The combination with the oppositely-moving carriers relatively arranged so as to adapt them to unite dovetailed lumber, of cross discharging-belts extending across both carriers so as to adapt them to eject the united lumber from the machine, and means for actuating said belts at proper intervals, substantially as specified.

18. The combination with cutters for forming the tongues upon the lumber, other cutters for forming the grooves therein, and oppositely-moving carriers relatively arranged so as to adapt them to carry the pieces of lumber past the cutters and into engagement with each other, of flue-applying mechanism located at the side of one of the carriers and between the cutters acting upon the stuff moved by that carrier and the point where the pieces are united, substantially as specified.

19. The combined tonguing, grooving and weaving machine, consisting of cutting mechanism for forming the tongues located at one end of the machine, cutting mechanism for forming the grooves located at the other end of the machine and oppositely-moving carriers for feeding the stuff past said cutting mechanisms, said carriers being extended so as to lap by each other intermediate of said cutting mechanism and otherwise arranged to carry the stuff into engagement, and means for holding the lumber upon said carriers while it is being operated upon, substantially as specified.

20. The combination with cutters for cutting the tongues, cutters for cutting the grooves, and oppositely-moving carriers relatively arranged and adapted to unite dovetailed lumber as described, of a series of pressure devices a portion whereof act upon the lumber during the cutting and another portion whereof act thereon during the uniting, substantially as specified.

21. The combination of two opposite feeders placed adjacent and parallel to each other and with one end of each extended past one end of the other, and pressure devices located as described so as to adapt them to hold the lumber in position while being joined by said feeders, substantially as set forth.

22. The combination with two oppositely-moving, parallel, adjacent and lapping feeders, adapted and arranged relatively to each other to carry the pieces of lumber to be joined into engagement with each other, of cutters for cutting the tongue on the edge of one piece, and other cutters for cutting the groove on the edge of the other piece, substantially as specified.

23. The lumber-joining machine having cutters for cutting interfitting dovetails on the surfaces of two different pieces of lumber, and means for bringing the pieces together and forcing the cut surfaces into engagement, substantially as specified.

24. The lumber-joining machine having two sets of cutters for forming interfitting dovetails on the surfaces of two pieces of lumber, and means for bringing said pieces together endwise with the dovetails in alinement, preparatory to forcing them into engagement, substantially as specified.

25. The lumber-joining machine having two sets of cutters for forming interfitting dovetails on the surfaces of two pieces of lumber, and means for bringing said pieces together endwise with the dovetails in alinement, and means for forcing the dovetails into engagement, substantially as specified.

26. The lumber-joining machine having two sets of cutters for forming interfitting dovetails on the surfaces of two pieces of lumber, and means for bringing said pieces together endwise with the dovetails in alinement and acting also to force the dovetails into engagement, substantially as specified.

27. The lumber-joining machine having two sets of cutters for forming interfitting dovetails on the surfaces of two pieces of lumber, and means for feeding said pieces past the cutters and into engagement with each other, substantially as specified.

28. The combination in a lumber-joining machine with means for uniting two pieces of lumber having interfitting dovetails formed on their proximate surfaces, of means for imparting a transverse movement to the united pieces, substantially as specified.

29. The combination in a lumber-joining machine with means for forming interfitting dovetails on the surfaces of two pieces of lumber, and means for uniting the pieces by means of said dovetails, of means for moving the united pieces transversely, substantially as specified.

30. The combination in a lumber-joining machine with means for forming interfitting dovetails on the surfaces of two pieces of lumber, and means for forcing the dovetails into engagement by a movement longitudinal of the dovetails, of means for moving the united pieces at right angles to the dovetails, substantially as specified.

ALBERT T. LINDERMAN.

Witnesses:
E. R. MORTON.
E. HARWOOD.